May 16, 1950     R. FRIEDMAN     2,508,152
SONIC METHOD FOR CONTROL OF AIR IN ICE CREAM
Filed Jan. 29, 1948
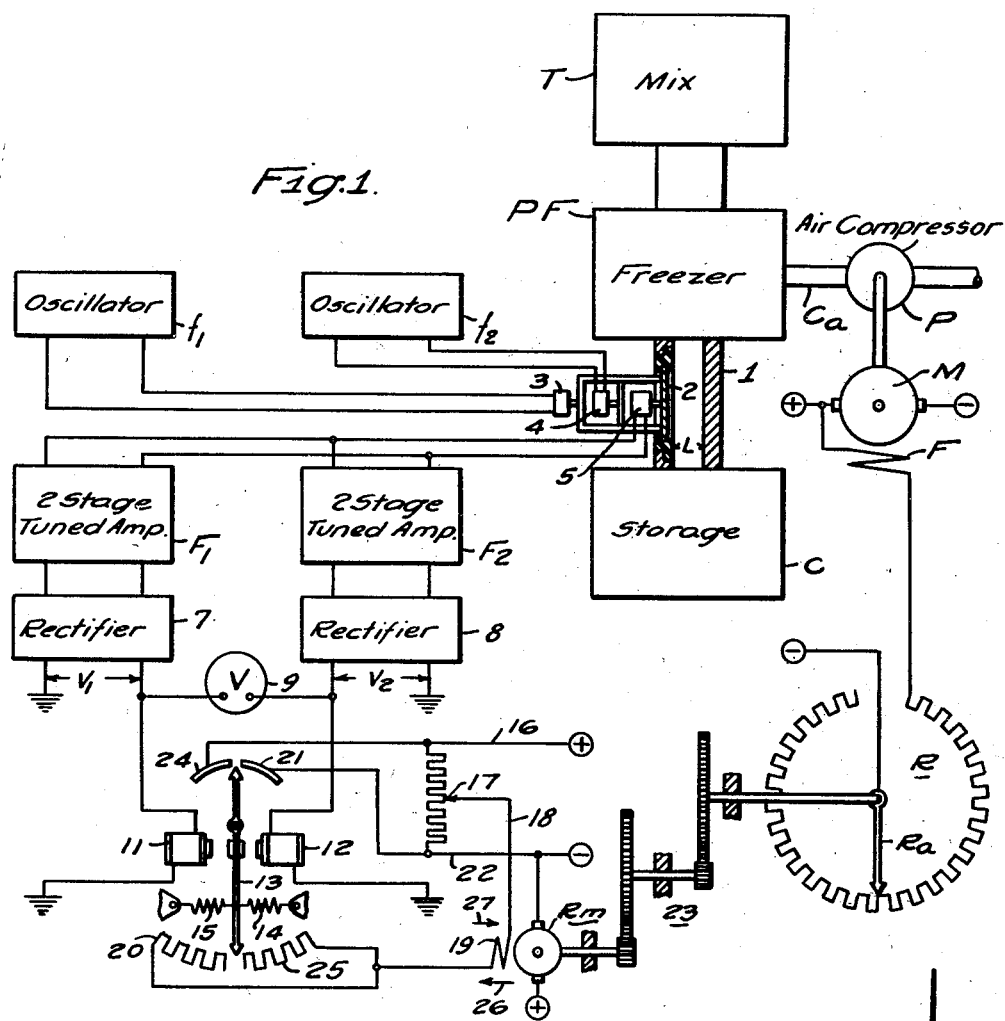
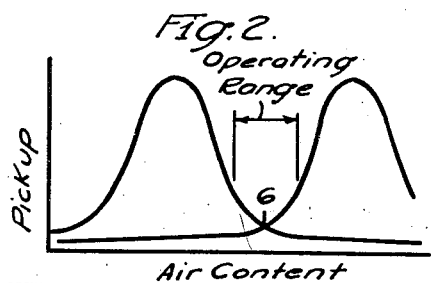
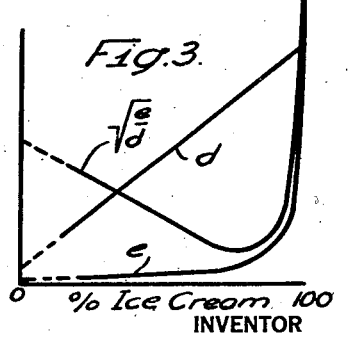
INVENTOR
Raymond Friedman.
BY
Paul C. Friedemann
ATTORNEY Patented May 16, 1950

2,508,152

UNITED STATES PATENT OFFICE 2,508,152

SONIC METHOD FOR CONTROL OF AIR IN ICE CREAM

Raymond Friedman, Madison, Wis., assignor to Westinghouse Electric Corporation, East Pittsburgh, Pa., a corporation of Pennsylvania Application January 29, 1948, Serial No. 5,173

7 Claims. (Cl. 99—234)

1

My invention relates to apparatus for measuring and indicating a physical characteristic of a material and more particularly relates to an electro-mechanical system for measuring the density of a treated fluid in relation to the density of an untreated fluid.

My invention will be described in its details in combination with a continuous process freezer for freezing ice cream, sherbets, and similar food products, but my invention is not limited to this field of use but has more general use in industry where the density of any fluid treated or having some other fluid of a different density added thereto is measured and indicated in relation to the density of the same fluid that has not been treated or to which no other fluids have been added. The fluid may be a gas or mixture of gases, a combination of a liquid and gas and/or gases, liquids and soluble or suspended solids, etc.

One broad object of my invention is the provision of measuring the density of an untreated fluid, measuring the density of a treated fluid, and comparing the measurements to thus gain information of the sufficiency of the treatment.

Another broad object of my invention is the provision of measuring the difference in density of a liquid before and after being subjected to a processing operation.

A somewhat more specific object of my invention is the continuous measurement of the changes in density of a liquid to which air is added while being subjected to a processing.

Another object of my invention is the provision of means for measuring, indicating, and regulating the mixture of two or more fluids in prescribed proportions.

To more completely comprehend some rather specific objects of my invention hereinafter recited, a brief statement of some specific problems in a particular industry may at this point be in order.

In the freezing of certain food mixtures, more particularly, ice cream, and to some extent sherbets, the amount of air beaten into the mixture has an important bearing on the texture, palatability, hardness, appearance, etc., of the finished product. Not only is the solubility of the finished product increased by the addition of the proper amount of air but the profit also depends on the amount of air beaten into the ice cream, or sherbet, during freeezing.

A still further object of my invention is to control the quantity of air introduced into an ice cream mix in a continuous process freezer.

A still other specific object of my invention is

2 to automatically control the air flow to a continuous process freezer, freezing ice cream or similar foods, as a function of the "over-run," a term defined hereinafter.

Other objects and advantages will become more apparent from a study of the following specification and the accompanying drawing, in which:

Figure 1 is a schematic showing of my invention as applied to a continuous process freezer;

Fig. 2 shows a pair of curves of utility in disclosing my invention; and

Fig. 3 shows three curves also of utility in disclosing my invention.

To better understand my contribution to the art, a few brief statements on the method heretofore in use, and still in use in most ice cream manufacturing establishments, will be helpful.

The amount of air in the ice cream is usually expressed as the volumetric percent of the liquid entering the freezer, and this percentage is termed the amount of "over-run." Thus 100% over-run means the addition of a volume of air, at the ice cream temperature, equal to the original volume of the liquid entering the freezer.

At present, a measure of control is obtained by taking samples of ice cream, preferably at equal intervals of time, and measuring the air content of each sample. This is done by weighing a known volume of ice cream from the freezer spout. The weight of the same volume of the incoming liquid mix is also determined. Knowing the weights of two identical volumes of liquid, the mix and the finished ice cream, the percent over-run may be computed as follows:

If the weight of a given volume of the entering liquid, or mix is $W_m$ and the weight of the same volume of ice cream is $W_i$, then the volume of air in the ice cream as a percent of the entering liquid voume is, neglecting the weight of the air.

$$P_0 = 100 \frac{W_m - W_i}{W_i}$$

Following such a determination of the percent over-run, $P_0$, the valve on the air line supplying air to the freezer, is then adjusted manually to change the supply of air to the freezer in such a way as to correct the measured inadequacy of the over-run.

This method of intermittent weighing and consequent subsequent intermittent changes in air pressure being supplied to the freezer, is considered quite unsatisfactory by ice cream producers. The method is slow and gives no assurance of correctness of over-run between determinations, nor does it assure a rapid asymptotic approach to the required over-run by the repeated adjustment of the air valve following each over-run determination. Moreover, variations in temperature of the incoming air and variations in refrigerant flow to the freezer make it impractical to proportion the liquid and air volume by means of positive displacement pumps having the desired ratio of volumetric delivery.

With the apparatus I provide, I obtain automatic control of the air admixture to the freezer in order to maintain a preselected degree of over-run to a high order of accuracy. Measurement of the over-run is accomplished in a continuous manner, a continuous indication and recording of the results are provided. In Fig. 1 my invention is shown as applied to existing ice cream freezing equipment. In such equipment the incoming liquid, or mix, to be supplied to a continuous process freezer PF is collected in a mix tank T, whence it is pumped by a suitable pump, not shown, preferably a positive displacement pump, to the freezer PF.

Air is supplied to the freezer from a suitable supply evidenced by conduit $C_a$. The air pressure, that is, the air flow to the freezer, is controlled by the pump P operated by the motor M. The mix and air are thus thoroughly mixed in the freezer by the action of scrapers and agitators and the combination is at the same time frozen. The frozen ice cream emerges from the freezer in a semi-fluid state in which it is fluid enough to just flow into its final container C and level off like a liquid surface.

My over-run regulating equipment includes a mix tank T, the automatic or continuous process freezer PF, a conduit 1, preferably rectangular in section, leading from the freezer PF to the receiving or storage receptacles or containers C. These storage containers may comprise a chain of them moving on a conveyor in position to be filled from conduit 1.

An air compressor or pump P driven by the motor M supplies air under pressure to the freezer PF through the compressed air conduit $C_a$. The motor M has its armature connected to a source of constant voltage shown and the speed is controlled by the rheostat R through suitable movements or adjustments of the rheostat arm $R_a$. By prior art methods, as hereinbefore indicated generally, the adjustment of the rheostat arm was done manually depending on the percent over-run found in the ice cream from periodic weighing of a given volume and then through a calculation comparing this weight with the weight of the same volume of mix.

In my system of control I continuously measure the percent over-run by, what I term, a sonic method. The measured result is utilized to automatically control the position of the rheostat arm $R_a$, to hold the percent over-run at a substantially constant value.

It is known that the velocity of sound through any medium is proportional to the square root of the ratio of the coefficient of elasticity of the medium and the density of the medium. For example, typical velocities are tabulated for various media; air, 1088 feet per second; water, 4700 feet per second; glass, 20,000 feet per second. My problem is to determine the percent over-run by utilizing the change in the velocity of sound through the finished ice cream after the air has been admixed thereto. It is known that the velocity of sound will vary considerably with the air content of the ice cream. By utilizing a change in the velocity with which sound is propagated to the ice cream, I propose to replace the present crude manual control systems in use for obtaining a certain per cent over-run of the ice cream. For a mixture of air and ice cream, the density will vary direct in proportion to the ice cream concentration. In other words, the density will vary in accordance with the curve $d$ shown in Fig. 3. The coefficient of elasticity, however, will not change linearly as the density but the change will be non-linearly as indicated by the curve $e$ in Fig. 3. The velocity of sound through the finished ice cream, namely, the combination of ice cream and air, will thus vary as the curve indicated by the square root of $e$ divided by $d$.

A resonant standing wave may be set up in the ice cream-air combination as it leaves the freezer, as for example, in the conduit 1 in such a way that it satisfies the equation:

$$V = 2fL$$

where V is the wave velocity and $f$ is the wave frequency and L represents the transverse dimension across the side walls of the conduit 1. The conduit 1 at this point is preferably provided with parallel side walls spaced from each other by the distance L. The frequency of the sonic wave to be employed should be chosen so that the dimension L is of a convenient magnitude, say, three to six inches. This frequency will be in the normal range of audio frequencies.

What constitutes a suitable frequency can readily be determined from the equation appearing in the preceding paragraph.

Since the mix has fixed contents of salt, sugar, milk, cream, solids, etc., its sound velocity may be readily established.

Suppose the velocity is 4800 feet per second and the parallel spacing of the walls of conduit 1 is to be three inches, then $$f = \frac{4800}{2 \times .25} = 9600 \text{ cycles per second}$$

At the region of the conduit 1 provided with the parallel side walls, I dispose a flexible plate 2. I provide two oscillators $f_1$ and $f_2$ which subject the flexible plate 2 simultaneously with two vibrations through the electromagnetic devices 3 and 4. The frequencies $f'_1$ and $f'_2$ of the oscillators $f_1$ and $f_2$ are chosen to differ from each other by a relatively small percent, as perhaps in the neighborhood of 15%. Further, the frequencies are so chosen that $$\frac{f'_1 + f'_2}{2}$$

will be the resonance frequency for the dimension L when the velocity of wave propagation is that corresponding to the ice cream-air mixture of the desired composition, namely when the over-run is of the correct value. In practice, this usually means an over-run of 100%. Also disposed in practical relation to the flexible plate 2 is the electromagnetic device 5 which will be responsive to the instantaneously vibratory conditions of the plate. The current pulsations produced by the electromagnetic device I supply to two-stage amplifiers $F_1$ and $F_2$, each being provided with rectifiers 7 and 8. The instantaneous and vibratory condition provided by the electromagnetic device 5 is continuously analyzed by the double amplification circuit represented between the two amplifiers $F_1$ and $F_2$. These amplifiers are so tuned and so selected by discriminative tuning that the superimposed frequencies are distributed electrically and separately supplied to the respective rectifiers 7 and 8.

Since, for the sonic condition of the mixture assumed, the over-run is at the desired value, the output voltages $V_1$ and $V_2$ of the rectifiers 7 and 8 respectively, will be equal. In other words, if the air content is at the correct value, the sonic velocity will be such that the operation will be at point 6, namely at the middle of the valley of the curve shown in Fig. 2. There will thus be no resonance across the dimension L at either frequency $f'_1$ or $f'_2$ and the pick-up of the two amplifiers and consequently their rectifier output voltages $V_1$ and $V_2$ will be equal, thus resulting in no available electrical potential for control purposes.

Now, if the air content in the finished ice cream rises above the desired value, the sonic velocity will increase and there will be an approach to the resonance condition at $f'_1$, the higher frequency. The amplifier $F_1$ tuned to the frequency will thus produce a higher rectified voltage so that $V_1$ will exceed $V_2$ and the voltage meter 9, which may be calibrated directly in terms of over-run, will indicate the voltage difference. I connect a solenoid 11 across the rectifier 7 and a solenoid 12 across the rectifier 8. For the conditions assumed, the energization of the solenoid 11 will be greater than the energization of solenoid 12 and in consequence, the arm 13 will move in a clockwise direction against the center springs 14 and 15, whereupon a circuit will be established from conductor 16 to junction 17, conductor 18, the field winding 19, a certain portion of resistor 20, the arm 13, segment 21 to the negative conductor 22. The armature of rheostat motor R$m$ is continuously energized, as shown. When the field winding 19 becomes energized, say for instance, in the direction indicated by the arrow 26, at or below the field winding, the rheostat motor R$m$ through the gearing 23 would actuate the rheostat arm R$a$ clockwise to decrease the excitation of the field winding F of the motor M driving the compressor P.

The operation of the motor M which is continuous to supply a continuous stream of air to the freezer will thus be so affected that its speed will decrease and in consequence, the amount of air being supplied to the freezer will decrease until the air content in the finished ice cream is again at the proper per cent over-run. Should the air content fall, as determined by the electromagnetic device 5 and its associated amplifiers, then the voltage $V_2$ will be greater than $V_1$ and the solenoid 12 will be more strongly energized than the solenoid 11. The result will be that arm 13 will now move counterclockwise, thereby establishing a circuit from conductor 16 through segment 24, arm 13, a portion of the resistor 25, the field winding 19, conductor 18, junction 17, to the negative conductor 22, the energization of the field winding 19, as indicated by the arrow 27 above the field, will be reversed and the speed of motor R$m$ will, of course, also be a function of the number of sections of resistor 25 being shunted.

Operation of motor R$m$ in the reverse direction through the reduction gears 23 operates the rheostat arm R$a$ in the clockwise direction to increase the speed of the motor M, to thereby increase the rate at which the arm is supplied to the freezer.

One important advantage of my system of control is that the speed of the rheostat motor R$m$ is determined by the voltage difference between $V_1$ and $V_2$. The change in the air being supplied to the freezer is thus not only proportional to the magnitude of the percent over-run from the desired value, but the correction is also made proportional to the rate of such departure. Furthermore, my invention is substantially independent of the exact composition of the ice cream flow, of the flow velocity, of the viscosity, and of the exact temperature of the mix and my equipment has the further advantage that it is extremely simple in operation and very easily cleaned.

While I have described but one embodiment of my invention, I am aware that others, particularly after having had the benefit of the teachings of my invention, may devise other similar electrical instruments for accomplishing the same of similar purposes. I, therefore, do not wish to be limited to the particular details herein disclosed.

I claim as my invention:

1. Apparatus for controlling the manufacturing process of ice cream, comprising, in combination, means for freezing ice cream, means for adding air to the ice cream during the freezing process, means for producing sound waves through a given thickness of ice cream and air mixture, measuring means for measuring the change in sound velocity in the ice cream and air mixture with changes in the relative proportions of air and ice cream from a given relative proportion of the mentioned ingredients, and control means responsive to said measuring means for changing the flow of air into the mixture to correct for the changes in the relative proportions of air and ice cream.

2. In apparatus for controlling the process of manufacture of ice cream, in combination, means for subjecting a given thickness of the finished ice cream of a given quality to a sound wave slightly greater in frequency than the resonance frequency of the given thickness of the finished ice cream, means for also subjecting the same thickness of the finished ice cream to a second sound wave slightly lower in frequency than the resonant frequency of the given thickness of ice cream of the given quality, measuring means responsive to the frequency of the oscillations of said given thickness of the finished ice cream whereby changes in the given quality of the ice cream will cause a more near in resonance oscillations in the ice cream with one or the other of the sound waves impressed on the ice cream depending on the direction of the change in the quality, and control means responsive to this change in relative resonance of the oscillations in the ice cream with reference to the sounds impressed thereon for changing the quality of the ice cream.

3. In apparatus for controlling the manufacturing process of ice cream, comprising, in combination, means for continuously freezing ice cream, means for continuously adding air to the ice cream during the freezing to control the percent over-run, means for measuring the change in sound velocity through the frozen ice cream with changes in the percent over-run, and means responsive to the measured change in sound velocity for controlling the means for adding air to the ice cream to maintain the percent over-run substantially constant.

4. In equipment for continuously freezing ice cream, the combination of apparatus for controlling the percent over-run in the finished ice cream, said apparatus including, a continuous freezer, a motor and pump driven thereby for continuously supplying air to the freezer to thus control the percent over-run, a discharge conduit leading from the freezer, said conduit at one transverse direction being of a selected width, means for producing sounds in the finished ice cream at the point of the conduit having the selected width, and means responsive to the change in sound velocity with changes in the percent over-run in the ice cream across said selected width, for controlling the speed of operation of the motor operating the pump.

5. In equipment for continuously freezing ice cream, the combination of apparatus for controlling the percent over-run in the finished ice cream, said apparatus including, a continuous freezer, a motor and air pump, or compressor, driven by the motor for continuously supplying air to the freezer to thus control the percent over-run, a discharge conduit having, at least one region thereof, a pair of parallelly disposed side walls spaced from each other at a selected distance, means for producing a sound in the ice cream at the spaced parallel walls, the sound being produced having a frequency lower in value by a relatively small percent than the resonant frequency for the thickness of the finished ice cream when having the desired over-run, means for producing a second sound in the ice cream at the spaced parallel walls, this second sound having a frequency higher in value by a relatively small percent than the resonant frequency of the ice cream for the thickness of the finished ice cream at the parallel walls when the ice cream has the desired over-run, electric means responsive to the sound transmitted by the finished ice cream, a pair of tuned discriminating amplifiers connected to said electric means, the tuning and characteristics of the respective amplifiers being so selected that the output voltage of one amplifier is proportional to the component of sound transmitted from one of the sounds and the voltage output of the other amplifier is proportional to the component of sound transmitted from the other sound, and means responsive to the output difference of said amplifiers for controlling the speed of said motor.

6. In a control for mixing two ingredients to produce a mixture in which the ingredients have certain relative proportions, in combination, means for adding one ingredient to the other in a continuous flow of the first ingredient, whereby the velocity with which sound is propagated in the mixture changes as a function of the change in the relative proportion of the ingredients, means for propagating a sound through a selected thickness of the mixture, sound responsive electrical means disposed to be affected by the sound propagated through said selected thickness of the mixture, and means responsive to the operation of said electrical means for controlling the rate at which the said one ingredient is added to the other.

7. In a control for mixing air to ice cream being frozen in a continuous freezer, in combination, a continuous freezer, means for moving ice cream mix through the freezer at a given rate, means for adding air at a given rate to the freezer to thus produce ice cream having a given over-run and thus having a physical characteristic such that sound is propagated through a given thickness, of the finished ice cream in a given time interval, means for producing a sound in the finished ice cream, and means operable in response to a change in the time period that sound is propagated through said given thickness of the finished ice cream for changing the rate at which air is supplied to the freezer.

RAYMOND FRIEDMAN.

No references cited.